(12) United States Patent
Kang et al.

(10) Patent No.: US 7,439,757 B2
(45) Date of Patent: Oct. 21, 2008

(54) APPARATUS AND METHOD FOR INSPECTING LIQUID CRYSTAL DISPLAY

(75) Inventors: Dong Woo Kang, Gyeongsangbuk-do (KR); Soung Yeoul Eom, Gyeongsangbuk-do (KR); Bong Chul Kim, Daegu-si (KR); Ki Soub Yang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 157 days.

(21) Appl. No.: 11/442,140

(22) Filed: May 30, 2006

(65) Prior Publication Data
US 2007/0046317 A1 Mar. 1, 2007

(30) Foreign Application Priority Data
Aug. 30, 2005 (KR) .................. 10-2005-0080127

(51) Int. Cl.
*G01R 31/00* (2006.01)
(52) U.S. Cl. ........................................ 324/770
(58) Field of Classification Search ............... None
See application file for complete search history.

(56) References Cited

U.S. PATENT DOCUMENTS

| | | | | |
|---|---|---|---|---|
| 4,899,105 A | * | 2/1990 | Akiyama | 324/758 |
| 5,177,437 A | * | 1/1993 | Henley | 324/754 |
| 5,406,195 A | * | 4/1995 | Schweitzer, Jr. | 324/96 |
| 6,396,299 B1 | * | 5/2002 | Hayashida | 324/770 |
| 6,850,080 B2 | * | 2/2005 | Hiroki | 324/750 |
| 6,987,547 B2 | * | 1/2006 | Yang et al. | 349/69 |
| 7,227,374 B2 | * | 6/2007 | Kang et al. | 324/770 |
| 2002/0130675 A1 | * | 9/2002 | Hiroki | 324/750 |
| 2006/0098155 A1 | * | 5/2006 | Choo et al. | 349/187 |
| 2007/0229735 A1 | * | 10/2007 | Lee et al. | 349/106 |

* cited by examiner

*Primary Examiner*—Jermele M Hollington
(74) *Attorney, Agent, or Firm*—Morgan, Lewis & Bockius LLP

(57) ABSTRACT

A liquid crystal display (LCD) inspection apparatus for inspecting an LCD panel, includes a worktable to support an LCD panel seated on a front side of the worktable, probe units to be electrically connected to the LCD panel, a backlight unit to emit light toward the LCD panel, a first polarizing plate arranged in front of the LCD panel to polarize the light, and a second polarizing plate arranged between the LCD panel and the backlight unit to polarize the light, and a shutter unit to selectively shut off the light emitted from the backlight unit toward the LCD panel.

9 Claims, 11 Drawing Sheets

APPARATUS AND METHOD FOR INSPECTING LIQUID CRYSTAL DISPLAY

This application claims the benefit of Korean Patent Application No. 10-2005-0080127, filed in Korea on Aug. 30, 2005, which is hereby incorporated by reference.

BACKGROUND OF THE INVENTION

1. Field of the Invention

The present invention relates to an apparatus for inspecting a liquid crystal display (LCD), and more particularly, to an LCD inspection apparatus that is capable of preventing reduction in life span of a backlight unit included in the LCD, and an inspection method using the inspection apparatus.

2. Discussion of the Related Art

In general, an LCD inspection apparatus is able to easily inspect, with the naked eye, whether or not an LCD panel has defects. FIGS. 1 and 2 illustrate such an LCD inspection apparatus according to the related art. As shown in FIGS. 1 and 2, the related art LCD inspection apparatus includes a body 1, an inspection stage 2 arranged at one side of the body 1 to inspect an LCD panel 10 (FIG. 2), and a loading/unloading stage 7 arranged at the other side of the body 1 to load the LCD panel 10 on the inspection stage 2 or to unload the inspected LCD panel 10 from the inspection stage 2. The LCD inspection apparatus also includes a carrier 9 (FIG. 2) mounted to the body 1 such that the carrier 9 is able to laterally move to transfer the LCD panel 10 from the loading/unloading stage 7 to the inspection stage 2, or from the inspection stage 2 to the loading/unloading stage 7.

The inspection stage 2 includes probe units 3, and a worktable 4 that brings the LCD panel 10 into contact with the probe units 3 and also provides light. The worktable 4 includes a polarizing plate 4a and a backlight 4b (FIG. 2). A moving stage 5 is arranged in the rear of the worktable 4, to move the worktable 4 so that the worktable 4 is connected to the probe units 3 in a state of being aligned with the probe units 3.

As shown in FIG. 1, a sub-table 8 is mounted to the loading/unloading stage 7. The sub-table 8 serves to incline the LCD panel 10 transferred from a loader (not shown) of the loading/unloading stage 7 by a predetermined angle (for example, 60°). A microscope 6 is mounted to the body 1 in front of the inspection stage 2 such that the microscope 6 is able to move in vertical and lateral directions. When determining whether the LCD panel 10 has defects during a macroscopic inspection operation for the LCD panel 10, the operator can use the microscope 6 to further precisely identify the defects in the LCD panel 10.

Next, an inspection procedure performed by the related art LCD inspection apparatus will be described as follows.

First, the LCD panel 10 to be inspected is transferred from the loader (not shown) of the loading/unloading stage 7 to the sub-table 8. The sub-table 8 inclines the LCD panel 10 by a predetermined angle while transferring the LCD panel 10 to the carrier 9. Subsequently, the carrier 9 places the LCD panel 10 on the inspection stage 2. Once the LCD panel 10 is seated on the inspection stage 2, the worktable 4 is moved toward the LCD panel 10 by the moving stage 5. Thereafter, the worktable 4 vacuum-chucks the LCD panel 10 so that the LCD panel 10 is fixed on the inspection stage 2, and then connects pads (not shown) of the fixed LCD panel 10 to lead pins (not shown) of the probe units 3, respectively. Thus, when an electrical connection is achieved between the LCD panel 10 and the probe units 3, a predetermined image signal from a pattern generator is input to the LCD panel 10 via the probe units 3. The pattern generator, which is an external image signal input unit, sequentially provides various image patterns. When the LCD panel 10 is illuminated by the backlight 4b, the various image patterns are sequentially displayed on the LCD panel 10. Accordingly, the operator can determine, through the displayed patterns, whether or not the LCD panel 10 has defects.

However, the above-described related art LCD inspection apparatus has various problems. For example, the related art LCD inspection apparatus typically uses a cold fluorescent lamp (CFL) or a cold cathode fluorescent lamp (CCFL) as the backlight 4b. During the defect inspection of the LCD panel according to the related art, the backlight 4b is frequently turned-on/off, thereby reducing the life span thereof and causing an increase in the costs. Accordingly, it is necessary to provide a new configuration capable of minimizing the operations of turning-on/off the backlight 4b. Further, the related art LCD inspection apparatus inspects the LCD panel 10 depending on the naked eye of the operator, thereby easily causing an inaccurate inspection due to the operator's carelessness. Moreover, it becomes time-consuming for one operator to completely inspect the LCD panel 10 in view of its increasing size. In addition, as shown in FIG. 3, when fine dust D is attached to the surfaces of upper and lower substrates 11 of the LCD panel 10, even though the fine dust D is not a defect in the LCD panel 10, it is practically very difficult for the operator to distinguish a point defect PD in LCD panel 10 from the fine dust D. As a result, even non-defective products may be determined as being defective, thereby degrading yield and increasing manufacturing costs.

SUMMARY OF THE INVENTION

Accordingly, the present invention is directed to an apparatus and method for inspecting a liquid crystal display (LCD) that substantially obviates one or more problems due to limitations and disadvantages of the related art.

An object of the present invention is to provide an LCD inspection apparatus that is capable of minimizing operations of turning-on/off a backlight unit, thereby reducing the maintenance costs of the backlight unit, and an inspection method using the inspection apparatus.

Another object of the present invention is to provide an LCD inspection apparatus that is capable of automatically and accurately detecting defects in an LCD panel, and an inspection method using the inspection apparatus.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD inspection apparatus for inspecting an LCD panel comprises a worktable which supports the LCD panel seated on a front side of the worktable, probe units which are electrically connected to the LCD panel, a backlight unit which emits light toward the LCD panel, a first polarizing plate which is arranged in front of the LCD panel to polarize the light, a second polarizing plate which is arranged between the LCD panel and the backlight unit to polarize the light, and a shutter unit which selectively shuts off the light emitted from the backlight unit toward the LCD panel.

In another aspect of the present invention, a liquid crystal display (LCD) inspection method comprises a light supply step for supplying electric power to a backlight unit to emit light, a panel preparation step for loading an LCD panel on a worktable, and a defect inspection step for performing a defect inspection for the LCD panel while controlling a shutter unit such that the light emitted from the backlight unit is radiated to the LCD panel, or is not radiated to the LCD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention associated with an LCD inspection apparatus and an LCD inspection method using the same according to the present invention, examples of which are illustrated in the FIGS. 4A to 9B. Wherever possible, the same reference numbers will be used throughout the drawings to refer to the same or like parts.

Figure 1:
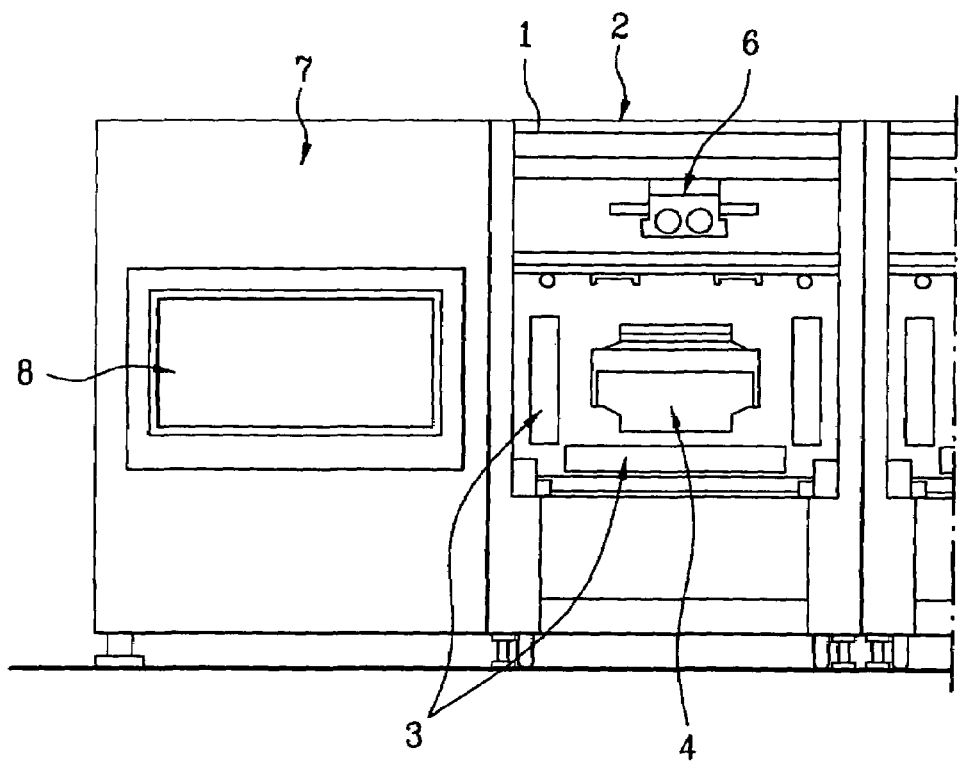
FIG. 1 is a front view schematically illustrating a liquid crystal display (LCD) inspection apparatus according to the related art.
Figure 2:
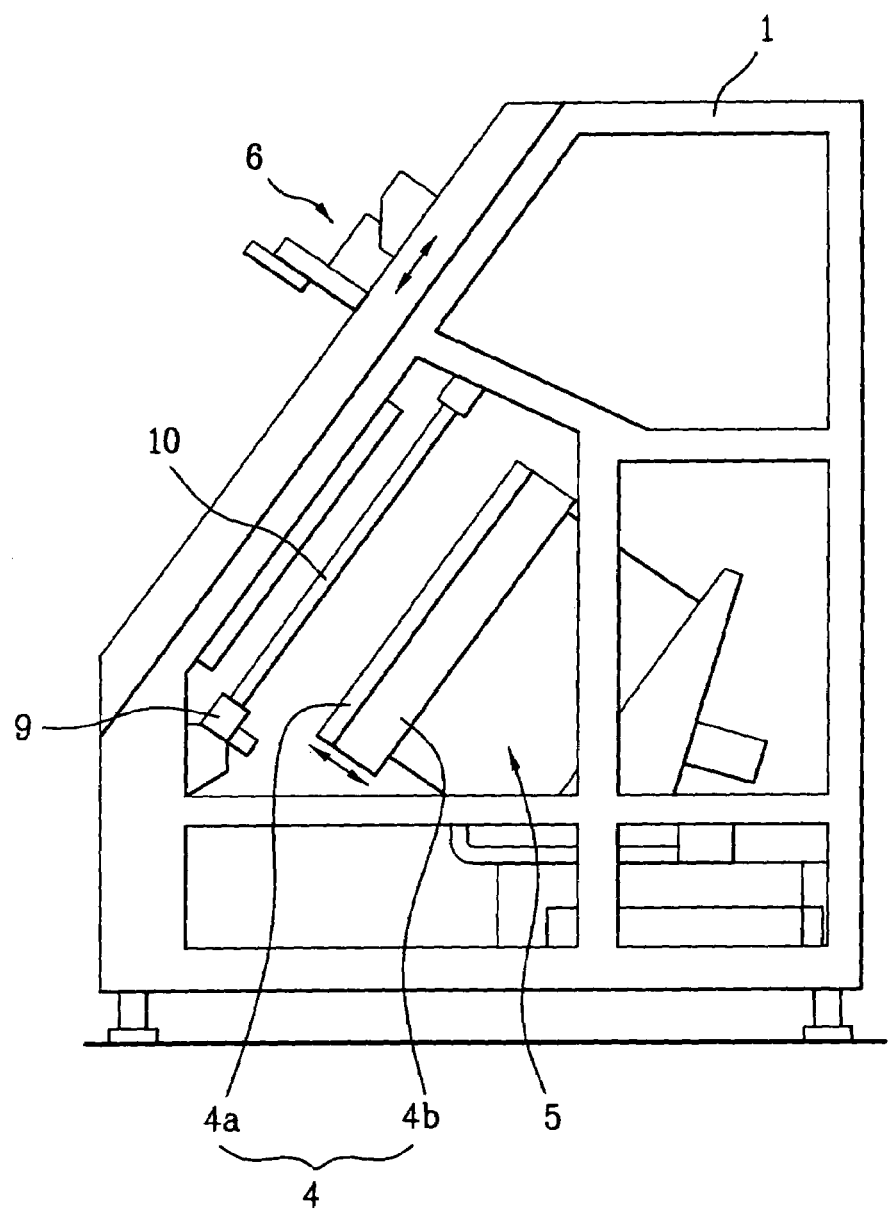
FIG. 2 is a side view schematically illustrating the LCD inspection apparatus of FIG. 1.
Figure 3:
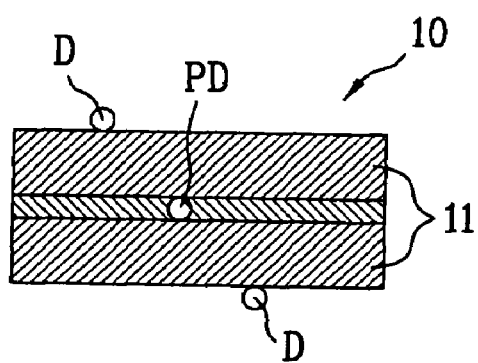
FIG. 3 is a sectional view of an LCD panel, illustrating an example of determining if the LCD panel has defects according to the related art.
Figure 4A:
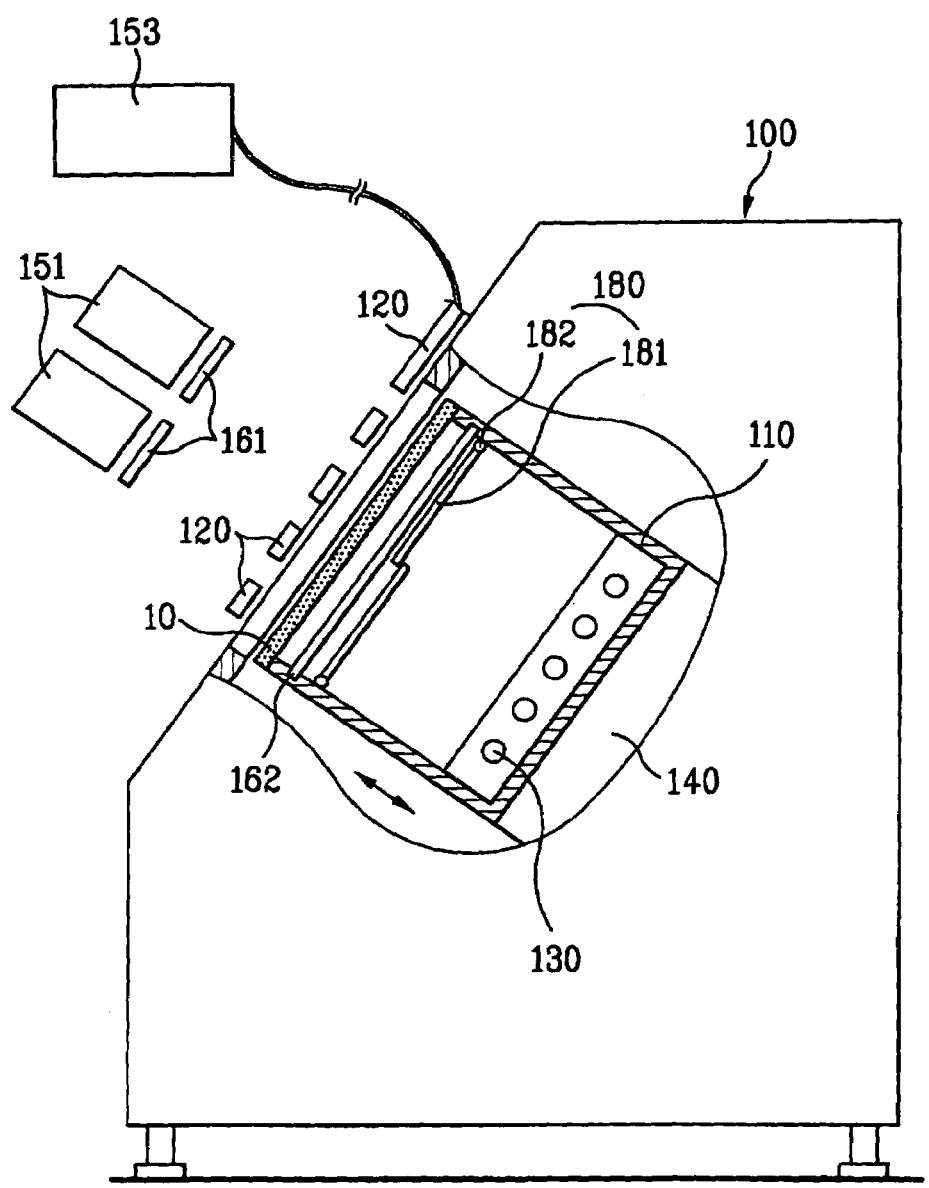
FIGS. 4A and 4B are side views schematically illustrating a configuration of an LCD inspection apparatus according to a first exemplary embodiment of the present invention.
Figure 4B:
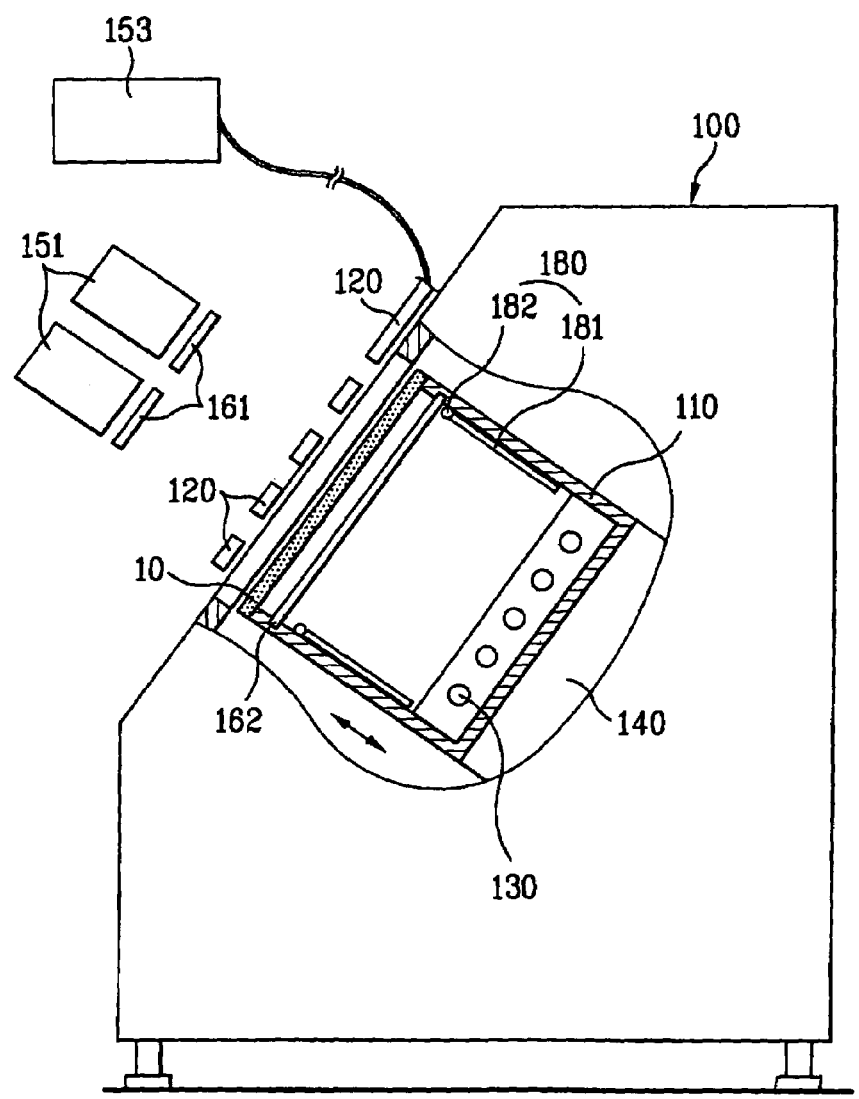

FIGS. 4A and 4B are side views schematically illustrating a configuration of an LCD inspection apparatus according to a first exemplary embodiment of the present invention. As shown in FIGS. 4A and 4B, the LCD inspection apparatus includes a worktable 110, a plurality of probe units 120, a backlight unit 130, a moving stage 140, a first polarizing plate 161, a second polarizing plate 162, and a shutter unit 180.

The worktable 110 is configured as a substantially-square hollow box, which includes a longitudinal opening. An LCD panel 10 is arranged in a front side of the worktable 110. The front side of the worktable 110 faces an imaging unit as will be described hereinafter. The plurality of probe units 120 are arranged around the opening of the worktable 110 in the front side of the worktable 110. Also, the plurality of probe units 120 are electrically connected to pads (not shown) of the LCD panel 10, respectively, and receive image signals of various patterns for inspection of the LCD panel 10 from a pattern generator 153, and supply the received image signals to the LCD panel 10.

The backlight unit 130 is arranged in a rear side of the worktable 110 to supply light to the LCD panel 10. Preferably, the backlight unit 130 may include a lamp that is selected from the group consisting of a cold fluorescent lamp (CFL), a cold cathode fluorescent lamp (CCFL), an external electrode fluorescent lamp (EEFL), and a high-brightness light emitting diode (LED). In particular, it is preferred that the backlight unit 130 be integrated with the worktable 110. The moving stage 140 is arranged in the rear of the worktable 110 to align the worktable 110 with the probe units 120, thereby connecting the worktable 110 to the probe units 120.

The first polarizing plate 161 is arranged between the imaging unit 151 and the LCD panel 10 to polarize light. The second polarizing plate 162 is arranged between the LCD panel 10 and the backlight unit 130 to polarize light. Preferably, the first polarizing plate 161 may be arranged adjacent to the imaging unit 151 as compared to the worktable 110. Otherwise, if the first polarizing plate 161 is arranged adjacent to the worktable 110, fine dust or foreign matter attached to the surface of the first polarizing plate 161 may be photographed, thereby mistakenly determining as defects in the LCD panel 10. On the other hand, the second polarizing plate 162 may be arranged inside the worktable 110 and close to the longitudinal opening of the worktable 110.

The shutter unit 180 serves to selectively shut off light, which is emitted from the backlight unit 130 to irradiate the LCD panel 10. In other words, by using the shutter unit 180, the backlight unit 130 can be always in an ON state to prevent the backlight unit 130 from being frequently turned-on/off. Therefore such an arrangement of the exemplary embodiment can prevent the reduction in life span of the backlight unit. Moreover, the shutter unit 180 may be arranged between the second polarizing plate 162 and the backlight unit 130. Alternatively, the shutter unit 180 may be arranged between the LCD panel 10 and the second polarizing plate 162.

Figure 5:
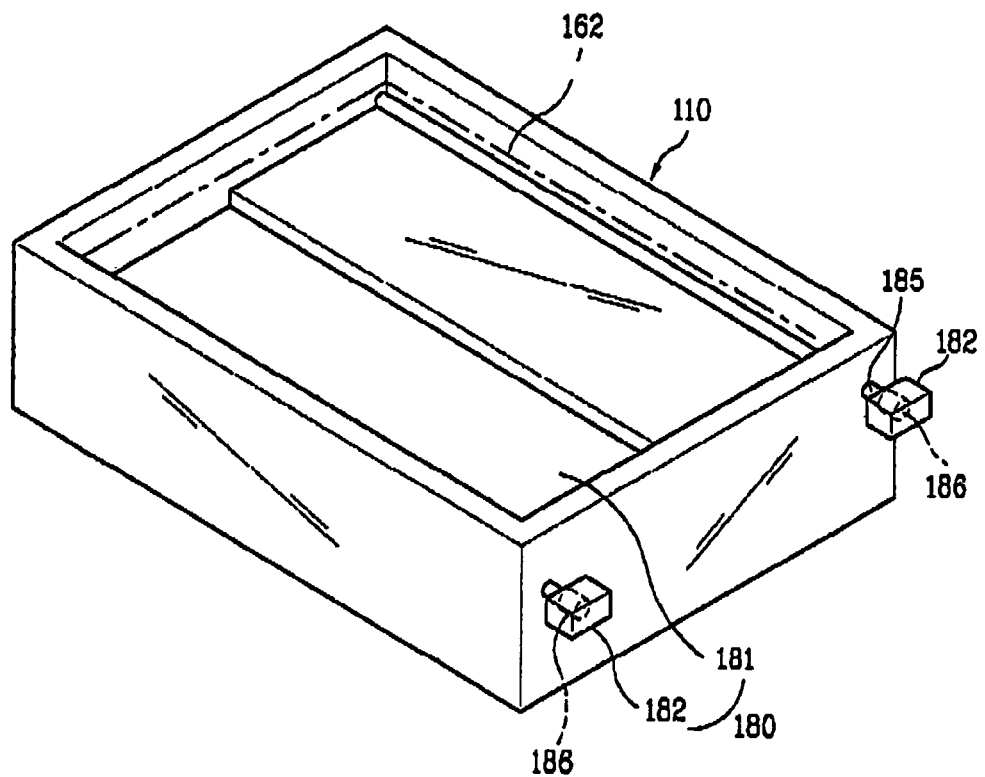
FIG. 5 is a perspective view schematically illustrating a detailed structure of a shutter unit in the LCD inspection apparatus of FIGS. 4A and 4B.

FIG. 5 illustrates a detailed structure of the shutter unit 180. As shown in FIG. 5, the shutter unit 180 includes a shutter 181 and a driver 182. The shutter 181 may be selectively positioned between the backlight unit 130 (FIGS. 4A and 4B) and the second polarizing plate 162 to selectively shut off the backlight unit 130 and second polarizing plate 162 from each other. The driver 182 is coupled to the shutter 181 to selectively position the shutter 181 between the backlight unit 130 and the second polarizing plate 162. In this exemplary embodiment, the driver 182 may include a motor 186 that has a shaft 185 coupled to one end of the shutter 181. The motor drives to hingably rotate the shutter 181 such that the shutter 181 selectively extends in a direction parallel or perpendicular to an emission direction of the light emitted from the backlight unit 130.

As shown in FIG. 5, the shutter 181 includes two shutters that operate separately from each other. Accordingly, it is preferred that the driver 182 include two drivers to drive the respective shutters. Of course, the shutter 181 may include three or more shutters. In this case, it is possible to reduce the size of each shutter 181, thereby reducing the distance between each shutter 181 and the backlight unit 130. It is also preferred that the shutters 181 overlap with one another to ensure that the light emitted from the backlight unit 130 is completely shut off. Moreover, the two shutters 181 are arranged in front of the longer-side portions of the backlight unit 130 arranged at opposite sides of the shorter-side center of the backlight unit 130, respectively, such that the shutters 181 are hingable to be selectively parallel or perpendicular to the emission direction of light.

In accordance with the above-described first exemplary embodiment of the LCD inspection apparatus, it is possible to irradiate the light emitted from the backlight unit 130 to the LCD panel 10 only when the irradiation is required, without frequently turning-on/off the backlight unit 130. Accordingly, it is possible to prevent the reduction in the life span of the backlight unit 130.

Next, an inspection method for inspecting the LCD panel 10 using the LCD inspection apparatus as described in the first exemplary embodiment will be described with reference to FIGS. 4A, 4B, 6, 7A, and 7B.

Figure 6:
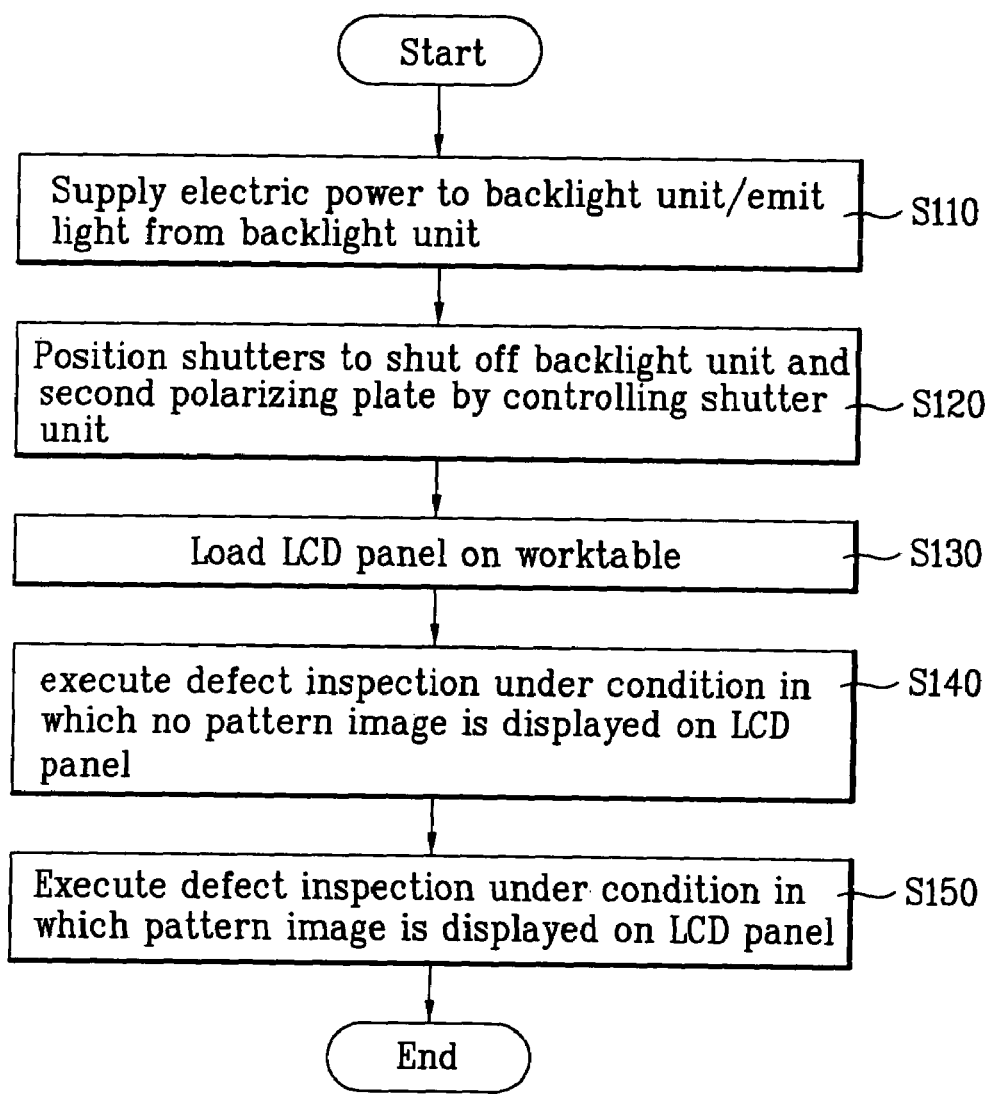
FIG. 6 is a flow chart explaining an LCD panel inspection method using the LCD panel apparatus of FIGS. 4A and 4B.
Figure 7A:
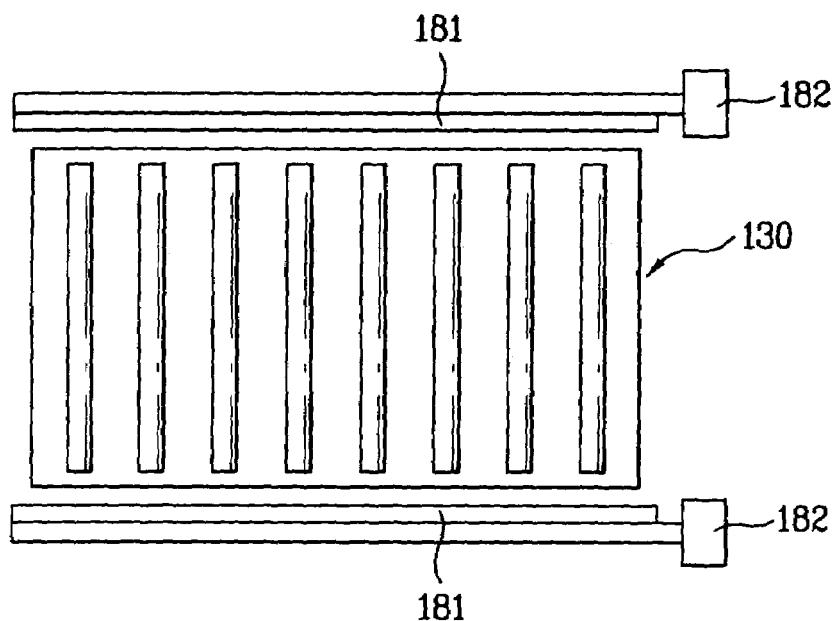
FIGS. 7A and 7B are schematic plan views explaining operation of the shutter unit in the LCD inspection apparatus of FIGS. 4A and 4B.
Figure 7B:
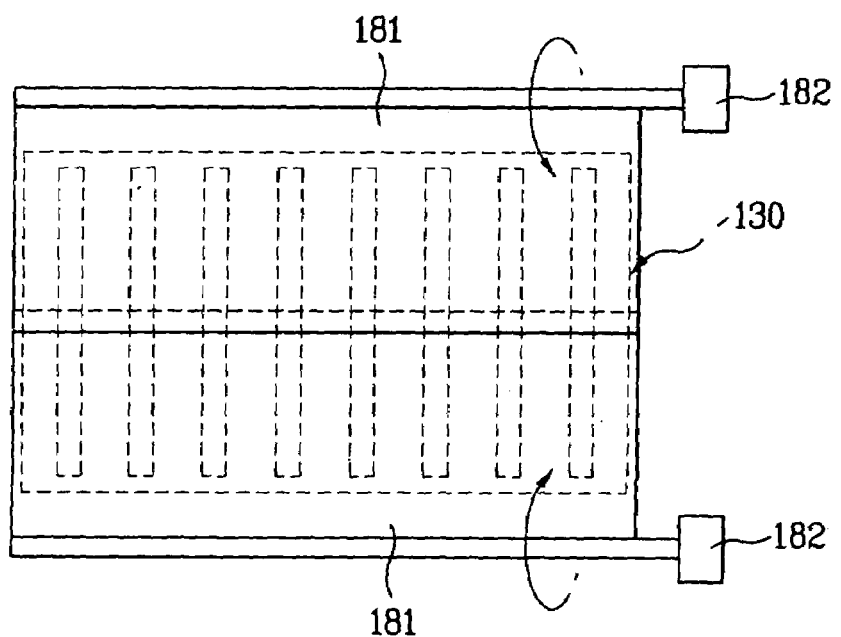

The exemplary inspection method includes five Steps of S110 to S150 as shown in FIG. 6. At Step S110, a light supply step is executed, during which electric power is supplied to the backlight unit 130 to turn on lamps of the backlight unit 130. In this step, it is necessary to prevent light emitted from the backlight unit 130 from being radiated to the second polarizing plate 162. For this reason, at Step S120, the shutters 181 of the shutter unit 180 are positioned to shut off the backlight unit 130 and second polarizing plate 162 from each other during the execution of the light supply step. If the shutters 181 of the shutter unit 180 are not in the positions where the shutters 181 shut off light emitted from the backlight unit 130 (namely, positions where the shutters 181 shut off the backlight unit 130 and second polarizing plate 162 from each other), the shutter unit 180 is controlled to cause the shutters 181 to completely shut off the backlight unit 130 and second polarizing plate 162 from each other. That is, the shutters 181 are positioned to shut off the light emitted from the backlight unit 130 in the control of the driver 182 of the shutter unit 180, as shown in FIGS. 4A and 7B. As a result, the light emitted from the backlight unit 130 is blocked from irradiating the second polarizing plate 162.

At Step S130, a panel preparation step is executed under the condition in which light is emitted from the backlight unit 130 as described above. At this step, an LCD panel 10 is loaded on the worktable 110. That is, the LCD panel 10 is transferred to the worktable 110, and is then seated on the front side of the worktable 110. In this exemplary embodiment, the LCD panel 10 has been subjected to a panel bonding process and a cutting process to be formed as a unit panel. The LCD panel 10 has also been formed with data shorting pads (not shown) for application of electric signals to a plurality of data lines, and gate shorting pads (not shown) for application of electrical signals to a plurality of gate lines. The data shorting pads and gate shorting pads are formed on a front surface of the LCD panel 10 along outer peripheral edges of the LCD panel 10. When the LCD panel 10 is seated on the front side of the worktable 10, the moving stage 140 drives to forwardly move the worktable 110. Accordingly, the shorting pads of the LCD panel 10 come into contact with the respective lead pins (not shown) of the probe units 120, thereby electrically connecting them.

At Steps S140 and S150, after completion of the loading of the LCD panel 10 in the above-described manner, a defect inspection step is executed to inspect whether or not the LCD panel 10 has defects. At the two steps, the shutter unit 180 is selectively controlled such that the light emitted from the backlight unit 130 is allowed to irradiate the LCD panel 10, or is blocked from irradiating the LCD panel 10. Step S140 performs a defect inspection for the LCD panel 10 under the condition in which no pattern image is displayed on the LCD panel 10 (this step will be referred to as a "first inspection step", hereinafter). Step S150 performs a defect inspection for the LCD panel 10 under the condition in which a pattern image is displayed on the LCD panel 10 (this step will be referred to as a "second inspection step", hereinafter).

The first inspection step S140 includes consecutive procedures for inspecting whether or not foreign matter is present on the surfaces of the LCD panel, under the condition in which only the light emitted from the backlight 130 is supplied to the LCD panel 10. At this step, the shutters 181 of the shutter unit 180 are completely opened for the backlight unit 130 and the second polarizing plate 162. That is, the driver 182 of the shutter unit 180 drives to hingably rotate the shutters 181 such that the shutters 181 extend in a direction parallel to the emission direction of the light. Thus, as shown in FIGS. 4B and 7A, the shutters 181 completely open the backlight unit 130 to the second polarizing plate 162. As a result, the light emitted from the backlight unit 130 is irradiated to the LCD panel 10. Accordingly, if there is foreign matter attached to the surfaces of the LCD panel 10, the foreign matter is displayed in the form of shade by the irradiated light, and the operator can recognize the presence of the foreign matter.

In this exemplary embodiment, information about foreign matter recognized in the above-described procedure is excluded from information used to identify substantial defects in the LCD panel 10 in a subsequent procedure. Of course, the shutter unit 180 may be selectively controlled by the operator during the execution of the first inspection step. That is, if necessary, the operator inspects whether or not there is foreign matter attached to the surfaces of the LCD panel 10 after controlling the shutter unit 180 to completely shut off the second polarizing plate 162 from the backlight unit 130.

The second inspection step S150 includes consecutive procedures for inspecting whether or not there are point defects (PDs) or line defects (LDs) in particular pixels of the LCD panel 10 while displaying images of various patterns on the LCD panel 10. At this step, the shutters 181 of the shutter unit 180 are completely opened for the backlight unit 130 and the second polarizing plate 162. This operation is carried out in the same manner as in the above-described first inspection step. As a result, the light emitted from the backlight unit 130 is irradiated to the LCD panel 10, thereby displaying images of various patterns on the LCD panel 10. Thus, the operator can more accurately perform a defect inspection using the various pattern images. The pattern images are supplied from the pattern generator 153, and are displayed on the LCD panel 10 via the probe units 120.

Figure 8:
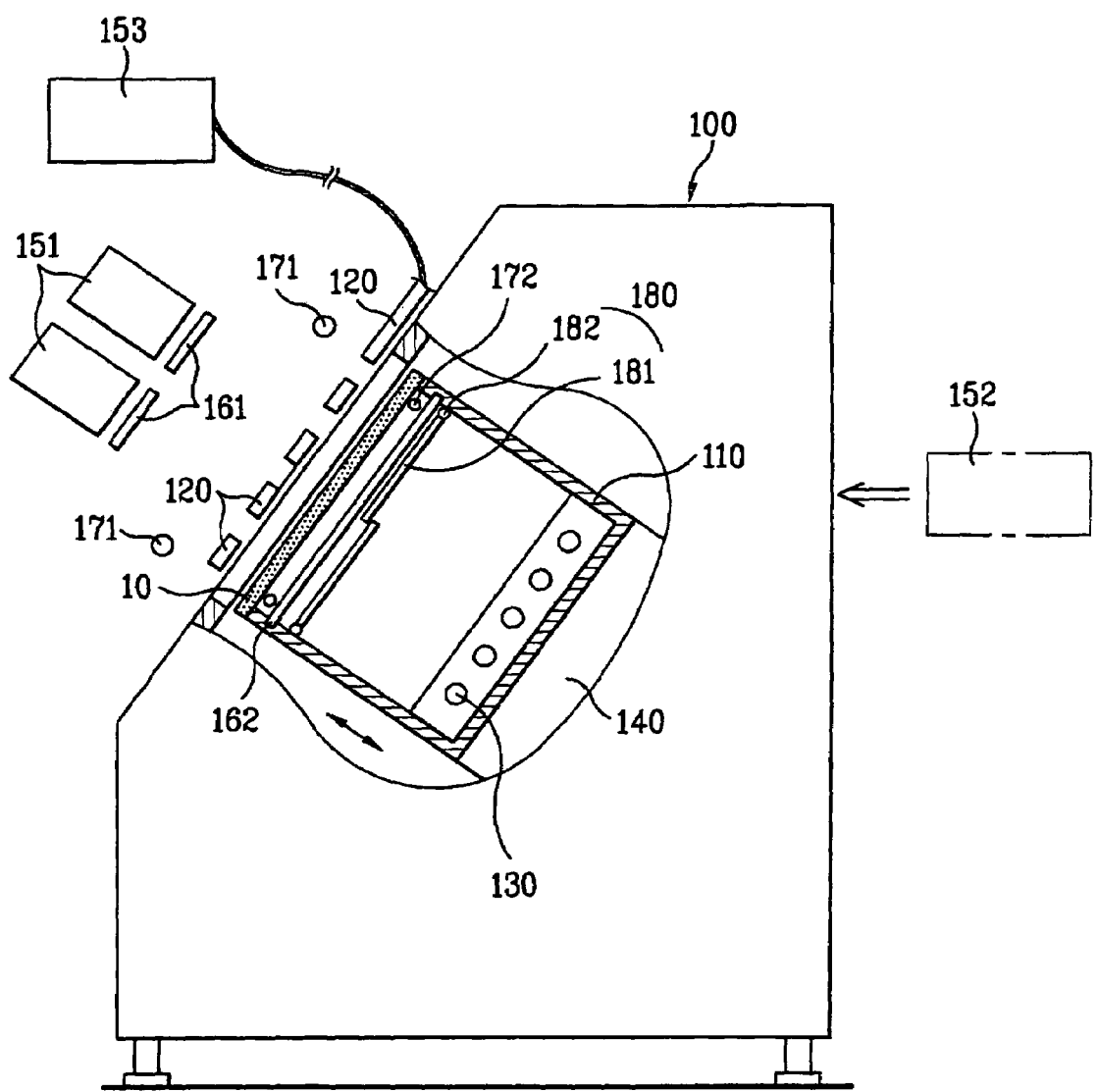
FIG. 8 is a side view schematically illustrating an LCD inspection apparatus according to a second exemplary embodiment of the present invention.

FIG. 8 illustrates an LCD inspection apparatus according to a second exemplary embodiment of the present invention. The LCD inspection apparatus according to the exemplary second embodiment automatically performs a different defect inspection for the LCD panel 10 from that of the first exemplary embodiment in which the defect inspection for the LCD panel 10 depends on the naked eye of the operator.

In addition to the configuration of the LCD inspection apparatus according to the first embodiment of the present invention, the LCD inspection apparatus according to the second embodiment includes an imaging unit 151, an image processor 152, and illumination units 171 and 172.

The imaging unit 151 may be a camera that photographs images of various patterns displayed on the LCD panel 10. As shown in FIG. 8, the imaging unit 151 is spaced apart from the front side of the worktable 110 by a predetermined distance. Preferably, the imaging unit 151 may include a charge coupled device (CCD) camera. More preferably, the imaging unit 151 may include a CCD camera having a resolution substantially equal to or higher than that of the LCD panel 10. In particular, it may be difficult to photograph the entire region of the LCD panel 10 using one imaging unit 151 in view of the recent trend of increasing sizes of the LCD panels. For this reason, the imaging unit 151 may include two or more imaging sub-units.

The image processor 152 receives an image produced by the imaging unit 151, and extracts defect information from the received image. The image processor 152 is also configured to convert the extracted defect information to corresponding data. In this case, it is preferred that the image processor 152 and pattern generator 153 be connected such that they can perform data transmission and reception therebetween.

The illumination units 171 and 172 serve to irradiate illumination light to the front and back surfaces of the LCD panel 10 seated on the worktable 110, respectively.

The first and second illumination units 171 and 172 enable the operator to identify the fine dust or foreign matter attached to the surfaces of the LCD panel 10 and the polarizing plates 161 and 162. For example, the operator can identify the foreign matter attached to the LCD panel 10 when the first and second illumination units 171 and 172 irradiate illumination light only to the (front and rear) surfaces of the LCD panel 10. The first and second illumination units 171 and 172 are arranged between the imaging unit 150 and the backlight unit 130. Preferably, the first and second illumination units 171 and 172 may be arranged along the peripheries of the LCD panel 10 seated on the worktable 110, thereby emitting the illumination light toward the surfaces of the LCD panel 10. Thus, the first and second illumination units 171 and 172 supply side light to the LCD panel 10 to enable the operator to more easily identify whether or not there is foreign matter present on the surfaces of the LCD panel 10.

Specifically, as shown in FIG. 8, the first illumination unit 171 is spaced apart from the LCD panel 10 toward the front surface of the LCD panel 10, whereas the second illumination unit 172 is spaced apart from the LCD panel 10 toward the rear surface of the LCD panel 10. Moreover, the first illumination unit 171 is preferably arranged between the first polarizing plate 161 and the LCD panel 10, whereas the second illumination unit 172 is preferably arranged between the second polarizing plate 162 and the LCD panel 10. Moreover, preferably, each of the illumination units 171 and 172 may include a lamp which is one selected from the group consisting of a CFL, a CCFL, an EEFL, and a high-brightness LED. In particular, it is preferred that the first illumination unit 171 include a CFL and the second illumination unit 172 include a CCFL. Although the LCD inspection apparatus has been described as including one illumination unit 171 and one illumination unit 172, a plurality of illumination units 171 and a plurality of illumination units 172 may be used, as will be appreciated by those skilled in the art.

Next, an inspection method for inspecting the LCD panel 10 using the LCD inspection apparatus according to the second embodiment of the present invention will be described with reference to a flow chart of FIG. 6, and schematic state views of FIGS. 4A, 4B, 7A, and 7B.

In accordance with the inspection method, a light supply step and a panel preparation step are sequentially executed. At the light supply step, electric power is supplied to the backlight unit 130 to emit light. At the panel preparation step, an LCD panel 10 is seated on the worktable 110. The light supply step and panel preparation step may be executed in the same manner as those of the LCD inspection method according to the first embodiment. Also, the light supply step may be executed after execution of the panel preparation step. During the execution of the light supply step, the shutters 181 of the shutter unit 180 are maintained in a state of completely shutting off the backlight unit 130 and second polarizing plate 162 from each other.

Thereafter, a defect inspection step is executed to inspect whether or not the LCD panel 10 has defects. At the defect inspection step, the shutter unit 180 is selectively controlled to allow the light emitted from the backlight unit 130 to irradiate the LCD panel 10, or to block the emitted light from irradiating the LCD panel 10. The defect inspection step may include one of three procedures, namely, a first procedure in which only the light emitted from each of the illumination units 171 and 172 is irradiated to the LCD panel 10, a second procedure in which only the light emitted from the backlight unit 130 is irradiated to the LCD panel 10, and a third procedure in which the light emitted from the illumination units 171 and 172 and the light emitted from the backlight unit 130 are both irradiated to the LCD panel 10. Practically, the first through third procedures are executed under the condition in which the light is always emitted from the backlight unit 130. That is, the backlight unit 130 is always turned on during the first through third procedures.

The first procedure is executed by controlling the shutter unit 180 to shut off the backlight unit 130 and LCD panel 10 from each other under the condition in which the electric power is supplied to the illumination units 171 and 172, thereby causing the illumination units 171 and 172 to emit illumination light toward the front and rear surfaces of the LCD panel 10. The second procedure is executed by controlling the shutter unit 180 to open the backlight unit 130 to the LCD panel 10 under the condition in which no electric power is supplied to the illumination units 171 and 172. The third procedure is executed by controlling the shutter unit 180 to open the backlight unit 130 to the LCD panel 10 under the condition in which the electric power is supplied to the illumination units 171 and 172, thereby causing the illumination units 171 and 172 to emit illumination light toward the front and rear surfaces of the LCD panel 10.

The first inspection step is not the procedure for detecting substantial defects (PDs or LDs) in the LCD panel 10. In fact, the first inspection step includes consecutive procedures for inspecting whether or not there is foreign matter on the surfaces of the LCD panel 10. In particular, during each procedure of the first inspection step, the state of the LCD panel 10 is photographed by the imaging unit 151. The resultant image is supplied to the image processor 152.

The second inspection step includes consecutive procedures for inspecting whether or not there are PDs or LDs in particular pixels of the LCD panel 10 while displaying images of various patterns on the LCD panel 10. The various pattern images are supplied by the pattern generator 153, and are displayed on the LCD panel 10 via the probe units 120. In this step, no electric power is supplied to the illumination units 171 and 172. At the same time, the shutters 181 of the shutter unit 180 operate to completely open the backlight unit 130 to the LCD panel 10. As a result, the light emitted from the backlight unit 130 is irradiated to the LCD panel 10, thereby displaying images of various patterns on the LCD panel 10. In particular, when each pattern image is displayed on the LCD panel 10, it is photographed by the imaging unit 151. The photographed image is then supplied to the image processor 152.

The image processor 152 gathers the image supplied at the first inspection step and the images supplied at the second inspection step, and deletes information about the foreign matter from the overall information of the LCD panel 10, thereby extracting the substantial defect information of the LCD panel 10. Accordingly, the defect inspection for the LCD panel 10 can be thus rapidly and accurately achieved through the above-described consecutive procedures.

Figure 9A:
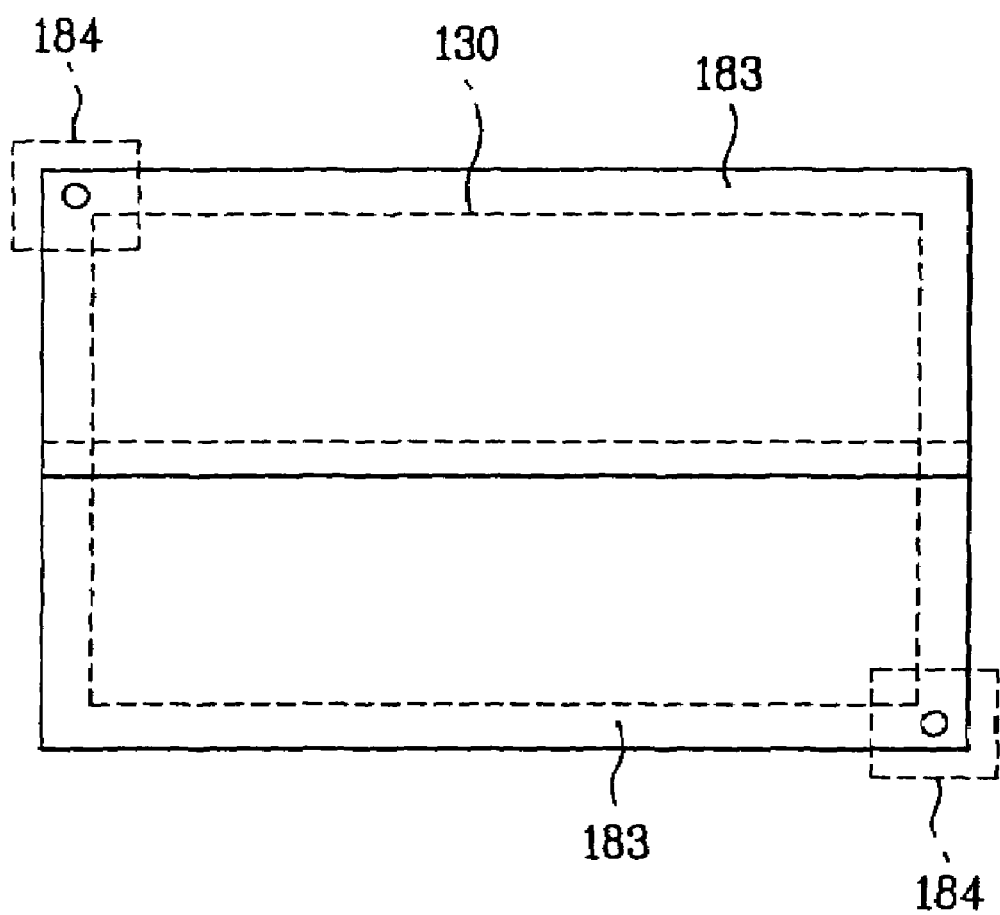
FIGS. 9A and 9B are schematic plan views explaining operation of a shutter unit in the LCD inspection apparatus of FIG. 8.
Figure 9B:
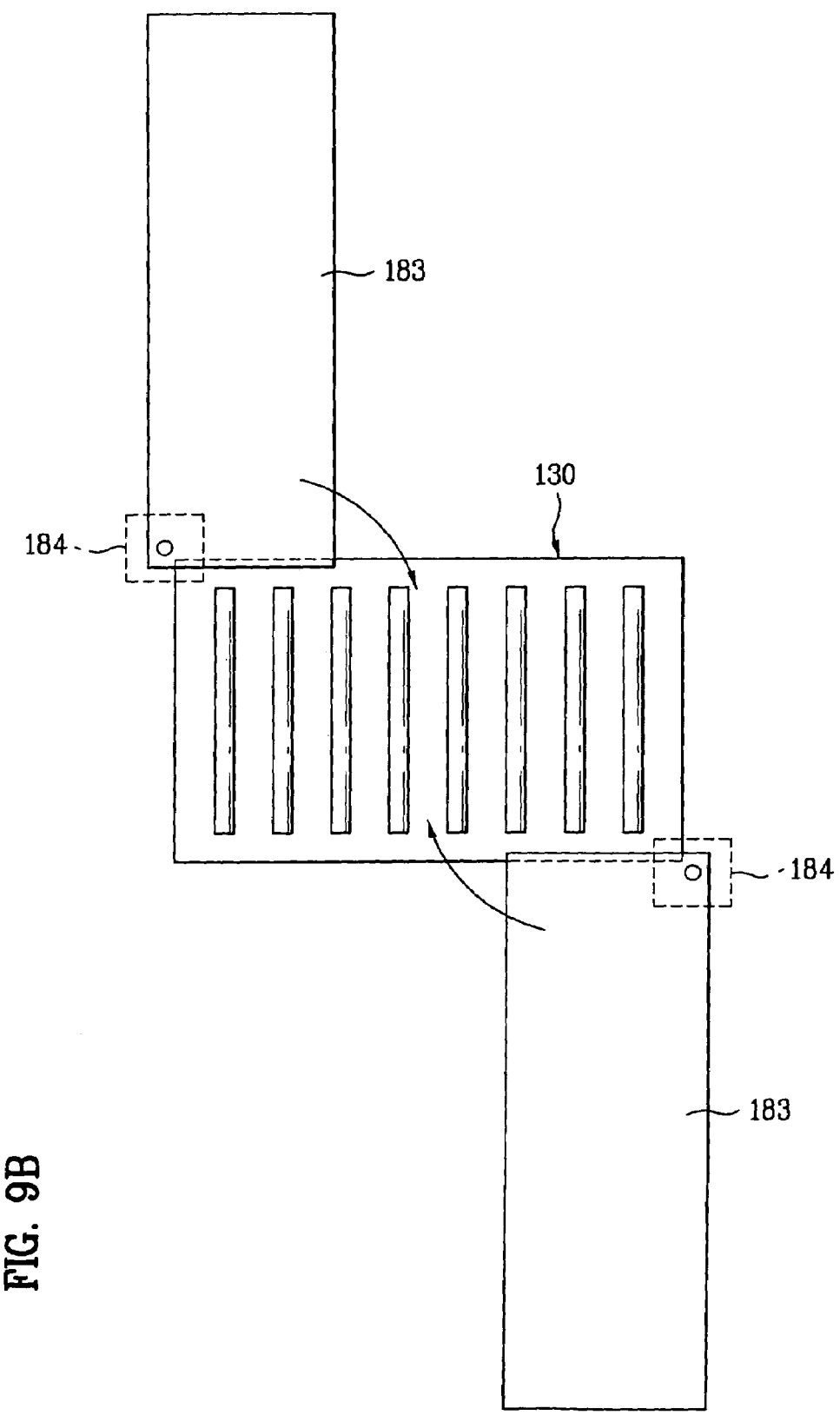

Moreover, the shutter unit 180 of the LCD inspection apparatus according to the present invention is not limited to those of the first and second embodiments. For example, the shutter unit 180 may include two or more shutters 183 which are hingable in a direction perpendicular to the emission direction of the light emitted from the backlight unit 130, to selectively shut off the light emitted toward the LCD panel 10, as shown in FIGS. 9A and 9B. In this example case, a driver 184, which hingably rotates an associated one of shutters 183, includes a motor which has a shaft coupled to one end of the shutter 183. The shaft of the motor extends in a direction perpendicular to an extension direction of the associated shutter 183. Accordingly, each shutter 183 can selectively shut off the light emitted from the backlight unit 130 to the LCD panel 10. That is, when it is necessary to prevent the light emitted by the backlight unit 130 from being irradiated to the LCD panel 10, each shutter 183 is positioned to shut off the backlight unit 130 and LCD panel 10 from each other, as shown in FIG. 9A. On the other hand, when it is necessary to irradiate the light emitted by the backlight unit 130 to the LCD panel 10, each shutter 183 is positioned to escape from an optical path defined between the backlight unit 130 and the LCD panel 10, as shown in FIG. 9B. Of course, although not shown, the light shut-off structure of the shutter unit 180 may be implemented using a shutter structure used in general cameras.

Thus, the LCD inspection apparatus according to the present invention is useful in that it is variously changeable, if necessary. As apparent from the above description, the LCD inspection apparatus and method according to the present invention have various advantages. First, the present invention keeps the backlight unit always in an ON state during a defect inspection of an LCD panel, thereby preventing the backlight unit from being frequently turned-on/off and minimizing damage to the life span of the backlight unit. Second, the present invention is able to achieve an accurate defect inspection result because the information determined as being foreign matter, such as fine dust, attached to the surfaces of the LCD panel can be excluded from the information of actual pixel defects.

It will be apparent to those skilled in the art that various modifications and variations can be made in the apparatus and method for inspecting the LCD of the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) inspection apparatus for inspecting an LCD panel, comprising:
    a worktable that supports the LCD panel to be seated on the worktable;
    probe units that are electrically connected to the LCD panel;
    a backlight unit that emits light toward the LCD panel;
    a first polarizing plate that is arranged in front of the LCD panel to polarize the light;
    a second polarizing plate that is arranged between the LCD panel and the backlight unit to polarize the light; and
    a shutter unit that selectively shuts off the light emitted from the backlight unit toward the LCD panel,
    wherein the shutter unit is arranged between the second polarizing plate and the backlight unit,
    wherein the shutter unit includes at least one shutter that is selectively positioned between the backlight unit and the second polarizing plate; and
    a driver that is coupled to the shutter to selectively shut off the backlight unit and the second polarizing plate from each other.

2. The LCD inspection apparatus according to claim 1, wherein the driver includes a motor that has a shaft extending in a direction perpendicular to an emission direction of the light emitted from the backlight unit, the shaft being coupled to one end of the shutter to hingably rotate the shutter such that the shutter selectively extends in a direction parallel or perpendicular to the emission direction of the light.

3. The LCD inspection apparatus according to claim 1, wherein the driver includes a motor that has a shaft extending in a direction perpendicular to an extension direction of the shutter, the shaft being coupled to one end of the shutter to hingably rotate the shutter in a direction perpendicular to an emission direction of the light emitted from the backlight unit.

4. The LCD inspection apparatus according to claim 2, wherein the at least one shutter comprises at least two shutter parts that selectively overlap with one another, thereby shutting off the light emitted from the backlight unit to the second polarizing plate.

5. The LCD inspection apparatus according to claim 3, wherein the at least one shutter comprises at least two shutters that selectively overlap with one another, thereby shutting off the light emitted from the backlight unit to the second polarizing plate.

6. The LCD inspection apparatus according to claim 1, further comprising:
    an imaging unit that photographs an image of the LCD panel seated on the worktable; and
    an image processor that receives an image produced by the imaging unit, and extracts defect information from the received image.

7. The LCD inspection apparatus according to claim 6, further comprising:
    illumination units which emit illumination light to surfaces of the LCD panel seated on the worktable.

8. The LCD inspection apparatus according to claim 7, wherein the illumination units include:
    a first illumination unit that is arranged between the first polarizing plate and the LCD panel, wherein the first illumination unit irradiates a front surface of the LCD panel from a periphery of the LCD panel; and
    a second illumination unit that is arranged between the second polarizing plate and the LCD panel, wherein the second illumination unit irradiates a rear surface of the LCD panel from a periphery of the LCD panel.

9. The LCD inspection apparatus according to claim 1, wherein the shutter unit is arranged between the backlight unit and the second polarizing plate.

* * * * *